United States Patent [19]

Lake

[11] 4,242,074
[45] Dec. 30, 1980

[54] APPARATUS FOR HEAT-TRIMMING FOAM MATERIAL

[75] Inventor: Connie Lake, Tinley Park, Ill.

[73] Assignee: Creative Industries, Inc., Bridgeview, Ill.

[21] Appl. No.: 747,953

[22] Filed: Dec. 6, 1976

Related U.S. Application Data

[63] Continuation of Ser. No. 595,530, Jul. 14, 1975, abandoned.

[51] Int. Cl.³ .................... B29C 17/00; B29C 17/14
[52] U.S. Cl. ................................ 425/292; 264/163; 264/321
[58] Field of Search .............. 83/16, 695; 425/290, 425/292, 441

[56] References Cited

U.S. PATENT DOCUMENTS

| | | | |
|---|---|---|---|
| 3,362,043 | 1/1968 | Langdon et al. | 425/215 |
| 3,475,526 | 10/1969 | Seto | 425/388 X |
| 3,572,424 | 3/1971 | Byrne | 425/441 X |
| 3,684,633 | 8/1972 | Haase | 428/174 X |
| 3,707,102 | 12/1972 | Huppenthal et al. | 83/171 |

Primary Examiner—Richard B. Lazarus
Attorney, Agent, or Firm—Hill, Van Santen, Steadman, Chiara & Simpson

[57] ABSTRACT

A thermoplastic material, such as a sheet of polystyrene or polyethylene foam, is placed between a trim guide, which may be a die mold or press, and is in the form of at least two heat-conducting metal pieces, one of which is movable towards the other. The trim guide is pressure-operated to pressurize the material along the area to be trimmed. This may be an edge of a plastic sheet, the perimeter of an article produced from the material, or may be holes or slots to be cut in the material. A knife or other tool, heated to a temperature high enough to melt the material, is then moved along the trim guide. The knife vaporizes the pressurized material along the trim guide, which creates a definitive point at which melting or vaporization of the material stops. The trim guide is made from metal having high heat-conductivity, such as aluminum which has sufficient heat-conductivity to create a point at which melting, caused by the knife vaporizing the material, stops.

7 Claims, 12 Drawing Figures

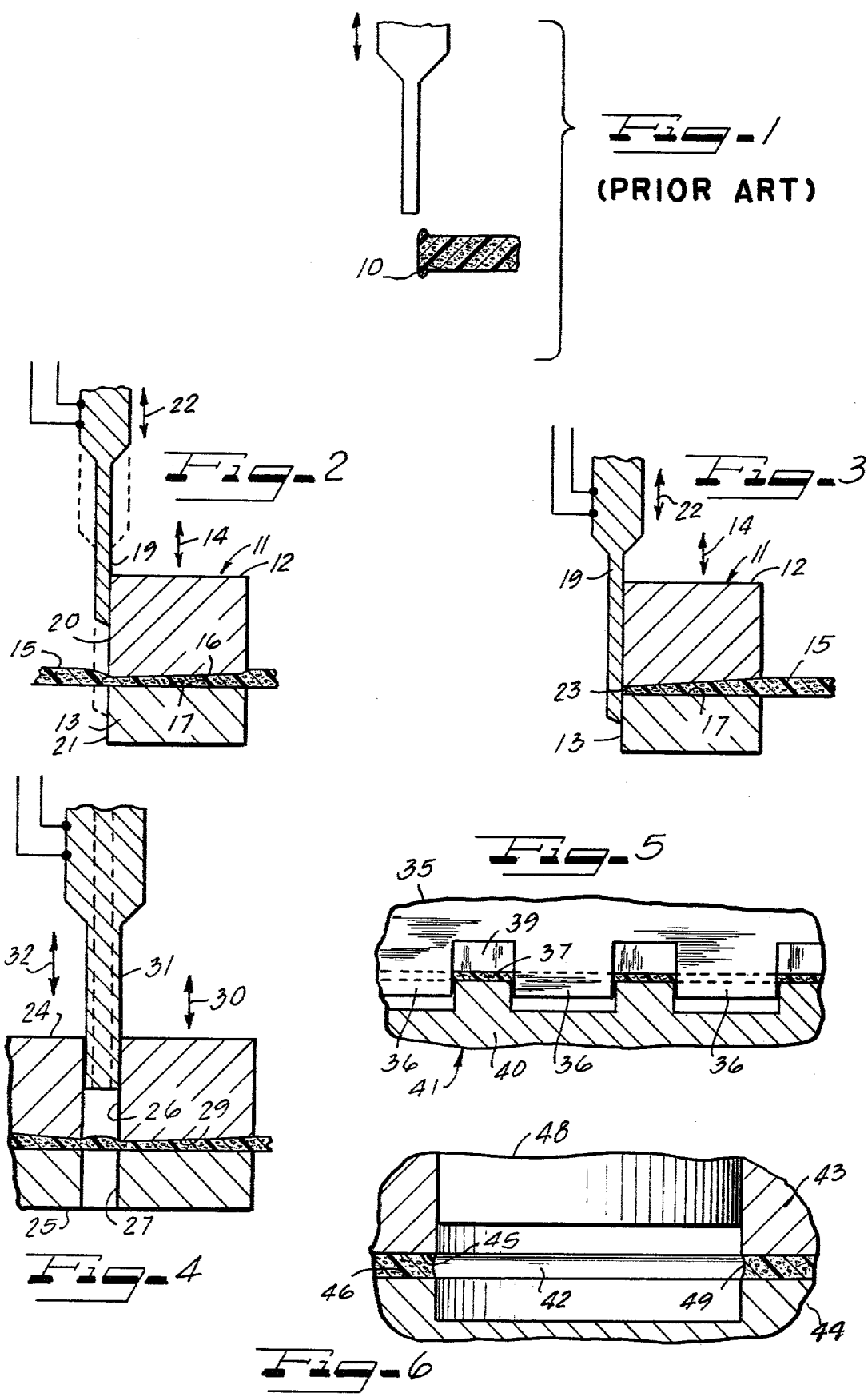

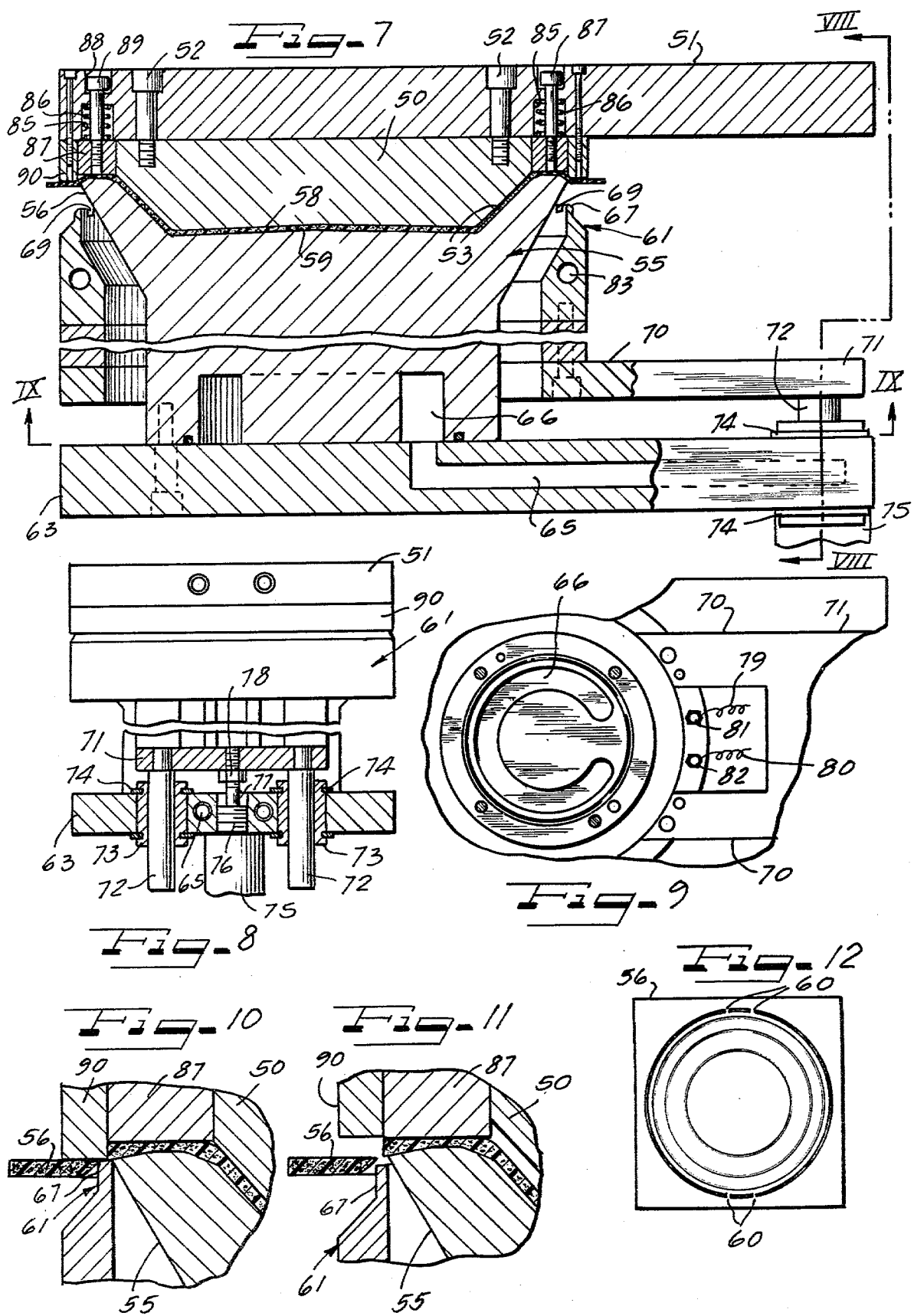

APPARATUS FOR HEAT-TRIMMING FOAM MATERIAL

This application is a continuation of application Ser. No. 595,530 filed July 14, 1975 and now abandoned.

PRIOR ART, BACKGROUND, SUMMARY AND ADVANTAGES OF INVENTION

Heretofore, thermoplastic materials such as polystyrene or polyethylene foam materials have been trimmed by heat-cutting with a thin tool. This creates a ridge or flash on the formed side of the material, which must be removed in a separate trimming operation. It also leaves a residue on the knife which cannot be heated to a temperature high enough to vaporize the material and still provide a clean edge. This residue must frequently be removed in order that the knife may perform an effective trimming operation.

Examples of prior art apparatus and processes are in the U.S. Pat. Nos. to Haase 3,684,633; Seto 3,475,526; Langdon et al 3,362,043; and Scalora 3,240,851.

In accordance with the principles of the present invention, the flash or ridge formed by the cutting tool, when cutting or trimming plastic material, is removed by pressurizing the material along the edge to be trimmed by a trim guide in the form of two pieces of metal of high heat-conductivity, which may be die or mold parts or separate parts of high heat-conductivity between which the material is placed. These two parts made from metal of high heat-conductivity are then moved toward each other to squeeze or pressurize the material along the area to be trimmed.

The plastic material may be a polystyrene or polyethylene foam of various densities, although it need not necessarily be a foam material, and where a sheen is required, may have a lamina of high-density polystyrene film on one side thereof which may be an oriented thermoplastic film.

A knife heated to a temperature high enough to melt the thermoplastic material, which may be high enough to vaporize the material, is then used to trim the material along the trim guie and provide a cleanly trimmed edge, which may be an internal or external edge, with no flash or heat ridge.

The trim guide is preferably made from aluminum, but may be made from other metals having high heat-conductivity, and holds and presses or pressurizes the material along the area to be trimmed and adsorbs the heat of cutting so the heat ridge or flash formerly present in heat-trimming of foam materials has no place to form. The trim guide may be the parts of a mold or die, and may be formed to accommodate a heated knife to trim the external periphery of a formed article or may be formed to accommodate a heated knife or tool to place slots or apertures of various forms in foam materials by pressurizing the material along the portion to be slotted or apertured while the heated knife or tool performs the slotting or aperturing operation, the trim guide or die parts of high heat-conductivity leaving no place for the flash or heat ridge to form during the slotting or aperturing operation.

The advantages of the present invention are that the deficiencies of heat-trimming of thermoplastic materials, such as polystyrene or polyethylene foam of the prior art are obviated by pressurizing a piece of thermoplastic material along the edge or perimeter to be trimmed by two pieces of metal of high heat-conductivity, and trimming the material along the two pieces of metal by a hot knife, hot enough to vaporize the material along the pieces of metal, which pieces of metal form a heat barrier at which the melting of the material stops.

Another advantage of the invention is that the heat ridge heretofore formed by trimming thermoplastic materials and particularly foam materials with a hot knife is obviated by the utilization of a knife or tool hot enough to melt the material and moving this knife or tool during its cutting operation along surfaces of high heat-conductivity, pressurizing the edge of the material, and cold enough to provide a heat barrier.

A still further advantage is that by confining foam material between two pieces of metal of high heat-conductivity and exerting pressure on the material along the edge or perimeter to be trimmed, a definitive point is created at which melting by the heated knife or trimming tool stops.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure.

DESCRIPTION OF THE DRAWINGS

FIG. 1 is a diagrammatic view illustrating the heat ridge formed by the prior art methods of trimming foam material by heat;

FIG. 2 is a diagrammatic view illustrating the pressurizing of the plastic material by a trim guide constructed in accordance with the principles of the present invention, and showing the pressurizing of the material along the edge to be trimmed, during the trimming operation;

FIG. 3 is a diagrammatic view somewhat similar to FIG. 2 and illustrating the completion of a trimming cut, showing the form the trimmed material will take along its edge at the termination of a trimming operation;

FIG. 4 is a diagrammatic view illustrating the slotting of a piece of plastic material by a heated knife or slotting tool;

FIG. 5 is a diagrammatic view illustrating the principles of the present invention for placing spaced elongated slots or apertures in a piece of plastic material;

FIG. 6 is a diagrammatic view illustrating the principles of the present invention applied to the placing of a circular aperture or the making of an internal continuous cut in a piece of foam material;

FIG. 7 is a sectional view taken through a forming die forming an article from a sheet of foam material, in which the principles of the present invention are applied to trim the perimeter of the article;

FIG. 8 is a fragmentary partial sectional view taken substantially along lines VIII—VIII of FIG. 7;

FIG. 9 is a fragmentary sectional view taken substantially along lines IX—IX of FIG. 7;

FIG. 10 is an enlarged transverse sectional view illustrating a knife in a trimming position trimming the peripheral portion of a formed article;

FIG. 11 is a view somewhat similar to FIG. 10, but showing the knife withdrawn from the trimmed article and a stripper coming into operation to strip the article from the mold; and FIG. 12 is a diagrammatic view showing the formed article in plan held to the sheet of foam material from which it is formed by tabs left during the trimming operation, to avoid the collection of scrap around the mold when removing the trimmed article therefrom.

DESCRIPTION OF PREFERRED EMBODIMENTS OF INVENTION

FIG. 1 of the drawings diagrammatically illustrates a prior art method of cutting thermoplastic material, and particularly polystyrene or polyethylene foam, by a heated cutting tool which may be in the form of a thin knife. Such cutting operations leave a ridge or flash 10 on the formed side of the material which must thereafter be trimmed to provide a clean edge free from flash. A residue also forms on the knife due to the fact that the knife cannot be heated to a temperature high enough to vaporize the material on the knife. This residue should be removed prior to each trimming operation.

In FIGS. 2 and 3 of the drawings, I diagrammatically illustrate the principles of the present invention and provide a trim guide 11 which may be in the form of a die, although it need not necessarily be a die, and may have upper and lower die parts 12 and 13, respectively, adapted to have a sheet of thermoplastic material 15 placed therebetween. The die parts 12 and 13 may be made from a metal of high heat-conductivity, such as aluminum, to provide a heat barrier and definitive edge along which melting of the material by the trimming operation thereof stops.

The die parts 12 and 13 may be cooled to provide the required heat barrier for trimming. The lower die part 13 may be stationary while the upper die part 12 may be moved toward and from the lower die part by suitable means such as power means diagrammatically illustrated by the double-headed arrow 14. As shown in FIGS. 2 and 3, the upper die part has a bottom surface 16 inclined toward the outer edge of the trim guide and cooperating with a flat upper surface of the lower die part 13 to squeeze or pressurize the foam material along the edge to be trimmed.

Means may be provided (not shown) for maintaining the temperature of the die parts at a temperature range of between 30° and 120° F. It should be understood that the die parts of the trim guide obtain heat only from the foam and a heated knife 19 trimming the pressurized foam material along the trimming edge of the trim guide.

A polystyrene or polyethylene foam, as herein shown, is in the form of a sheet and usually comes from an over prior to forming and trimming and is at a temperature in the order of 350° F. where the sheet is to be formed into an article such as a plate or any other article which may advantageously be formed from foam material. Of the plastic materials used for forming plates, cups and other articles, a polystyrene foam is more commonly used than polyethylene foam or other plastic materials, so polystyrene will hereinafter be referred to throughout the specification, although it is not intended that the invention be limited to polystyrene foam. The foam may be of various densities depending on the use to which the sheet is to be put and may be laminated with an outer relatively dense lamination of polystyrene foam and an inner lamina of an oriented thermoplastic film, preferably a biaxially oriented polystyrene film. The laminations of the film are not herein shown or described since they are well-known to those skilled in the art and are utilized to provide a dense surface on one side of the film and a less dense, or porous, surface on the opposite side of the film.

The knife 19 is suitably guided for movement along trim edges 20 and 21 of the die parts 12 and 13, respectively, to sever the foam sheet by melting the sheet as the knife passes along the trim edges 20 and 21. The knife is diagrammatically shown as being electrically heated and may be heated to a melting or vaporizing temperature that will melt the plastic, as the knife passes through the material to sever the material along the trim edges 20 and 21.

The heated knife 19 may be suitably guided and moved by power along the trim edges 20 and 21 to trim the sheet of plastic material and then be withdrawn therefrom. The means for moving the knife along the trim edges 20 and 21 is diagrammatically illustrated by a double-headed arrow 22.

FIG. 3 shows the knife 19 at the completion of a trimming operation of the plastic material and shows the form the material will take along its edge when trimmed which will slightly recede as indicated by reference numeral 23, caused by the melting or vaporization of the material and shows the edge to be completely free from a heat ridge formed by prior trimming operations.

The foam material pinched along the edge to be trimmed by the die parts 12 and 13 of the trim guide is thus held between the die parts 12 and 13 and the temperature of the knife 19 is sufficient to melt or even vaporize the material during a trimming operation. The usual heat ridge, therefore, has no place to form since the die parts 12 and 13 by their low temperature and high heat-conductivity create a definite region at which melting of the foam material by cutting thereof stops.

The die parts 12 and 13 thus restrict melting of the plastic by the cutter and are cold enough to stop melting along the trim edge of the die parts.

In FIG. 4, I have illustrated the principles of my invention applied to cutting or forming rectangular holes in foam material. In this form of the invention, die parts 24 and 25 are provided with registering apertured portions 26 and 27, respectively, which may pass entirely through said die parts. The die part 24 has bottom tapering die surfaces 29 tapering toward the apertured portion 26 to pressurize or confine the edge of the material about the portion thereof to be formed into an apertured portion or hole, which may be rectangular. The die part 24 is diagrammatically shown by the double-headed arrow 30 as being movable toward and from the die part 25 to exert pressure on the material and effect a pinching or pressurizing aperture.

A knife 31 heated to the melting or vaporizing temperature of the foam material and conforming to be apertured portions 26 and 27, is moved along said apertured portions by power to effect the formation of a rectangular aperture or an aperture of any form conforming to the form of the apertured portions 26 and 27 by suitable pressure means diagrammatically illustrated by the double-headed arrow 32. As shown in FIG. 4, the knife 31 is hollow and has cutting and melting edges conforming to the internal perimeter of the hole to be formed, although it need not be hollow, but may be solid or may be in the form of a plurality of thin heated knives connected to operate together and form the desired aperture in the material. The knife 31 is diagrammatically shown as being electrically heated which is a preferable means for maintaining the knife at the desired temperature.

In FIG. 5, I have shown a further embodiment of the invention in which a heated knife 35 is provided with a plurality of separate parallel blades 36 which may be formed to cut a series of slots in a piece of foam material 37 pressurized along the edges of the slots by upper and lower die parts 39 and 40 of a die 41 formed to provide a trim guide for cutting rectangular slots or apertures in the pinched foam material 37. The knife 35 is electrically heated and the die parts forming the trim guide are constructed and arranged to operate on the same principles as the die parts 12 and 13 of the trim guide 11.

In FIG. 6 of the drawings, I diagrammatically illustrate the cutting of a cylindrical hole in a piece of thermoplastic material 42. Die parts 43 and 44 have facing surfaces 45 and 46 formed to pressurize the thermoplastic material along the apertured portion to be formed. A cylindrical knife 48, which may be hollow, is moved along registering apertured portions of the die parts 43 and 44 and is electrically heated to a temperature high enough to melt or vaporize the thermoplastic material and form a cylindrical hole, the edge of which is slightly recessed, as indicated by reference numeral 49.

The knife 48, like the knife 31, may be hollow and preferably is a hollow knife, although where small cylindrical holes are to be formed, the knife need not necessarily be hollow, but may be solid.

In all forms of the invention illustrated in FIGS. 2 through 6 inclusive, the cutting operation is the same regardless of whether the thermoplastic material is to be trimmed along an edge which may be rectilinear, cylindrical or of any desired form and whether this edge is an external or internal edge and the die parts of the trim guide serve to retard melting of the material during cutting or trimming thereof and are cold enough to create a definite region stopping melting of the material along the trimmed edges thereof.

In FIGS. 7 through 12, I have illustrated the application of the principles of the present invention to the formation of an article, such as a dish or plate, from a sheet of polystyrene or polyethylene foam material, and have shown an apparatus for forming the article.

The forming apparatus is shown as including an upper die part 50 mounted on the bottom of a support plate 51 as by cap screws 52 and depending therefrom. The support plate 51 may be fluid-cooled and said support plate and upper die part 50 may be vertically moved by pressure means, such as fluid pressure cylinder and piston means (not shown) or other power or manually-operable means, to bring the upper die part 50 into registry with a dished portion 53 of a lower die part 55. A sheet of foam material 56, such as a polystyrene foam heated to oven temperature, which may be between 250° F. and 350° F., depending upon the article and material formed and type of foam required to form the article, may be placed between the die parts 50 and 55. The die part 50 may then be brought downwardly into engagement with the top surface of the sheet and moved to the position shown in FIG. 7 to form the sheet of foam material into a dish-like form, as shown in FIG. 12, and adhering to the sheet 56 by tabs 60.

The plate 51, upper die part 50 and lower die part 55 may be made from aluminum to provide good heat-conductivity and a heat barrier for the heat of an annular knife 61, trimming the edge of the plate, except for the tabs 60 to retain the plate to the sheet 56. The sheet and plate may then be removed from the die parts. The tabs may be broken off when the sheet and plate are away from the die parts, to avoid the necessity of cleaning scrap from the die parts, and are stacked in this condition. In many cases, a number of separated die parts are provided side-by-side to simultaneously make a plurality of plates or other articles from a single sheet of foam material.

The lower die part 55 is mounted on, and projects upwardly from, a base plate 63, which may also be made from aluminum and suitably mounted in spaced relation with respect to the ground. The base plate 63 has fluid passageways 65 leading thereinto and having communication with a coolant passageway 66 in the bottom portion of the lower die part 55 (FIG. 9) for the circulation of coolant, to maintain the lower die part at a temperature which will stop melting of the foam material during the trimming operation, by the heated knife 61.

The knife 61 is herein shown as being of an annular form encircling the lower die part 55 and having a relatively thin upper cutting edge 67 movable upwardly along the outer side of the lower die part 55 to trim the edge of the article formed between the die parts. The knife, however, need not be annular, but may be of any shape required to extend along the edges of the plastic material to be trimmed. As shown in FIG. 7, the knife 61 is provided with a plurality of recesses 69 therein to leave the tabs 60 and temporarily retain the formed article to the sheet 56, as shown in FIG. 12. The melting or vaporizing edge 67 of the knife 61, therefore, trims the entire periphery of the plate with the exception of the tabs 60,60 left to retain the article to its sheet until the sheet and article are removed from the forming dies 50 and 55 for stacking.

The annular knife 61 may also be made from a material of high heat-conductivity and is suitably mounted on the inner ends of parallel spaced arms 70 of a frame member 71. The frame member 71 and annular knife 61 are guided for vertical rectilinear movement toward and from the die 50 on guide shafts 72, depending therefrom, and slidably extending through bearings 73, suitably mounted in the base plate 63 and held in fixed relation with respect thereto as by snap rings 74, engaging opposite sides of said base plate 63.

A fluid pressure cylinder 75, which may be an air cylinder, has an upwardly projecting reduced diameter threaded portion 76 threaded in the base plate 63. A piston rod 77 is extensible from said cylinder and a piston (not shown) within said cylinder and is threaded at its upper end in the frame member 71. A nut 78, threaded on said piston rod, engages the underside of the frame member 71 to lock said plate to said piston rod 77. The admission of fluid under pressure, which may be air, to the head end of the cylinder 75 will thus move the knife upwardly along the edge of the lower die 55 to effect a vaporizing or melting operation. The knife may lower by gravity upon the release of fluid under pressure from the cylinder 75, or the application of fluid under pressure to the piston rod end of said cylinder.

The knife 61 is shown in FIG. 9 as being electrically heated through conductors 79 and 80 connected to terminals 81 and 82, respectively, and connected with a suitable electric heating element (not shown) extending along a passageway 83 extending about the knife 61 adjacent its base portion.

The plate 51 forming a support for the upper die part 50 is shown as having said die part secured thereto as by machine screws 52. Said plate has spaced downwardly opening sockets 85 therein, for springs 86. Said springs are seated at the upper end portions of said sockets at one end, and on an annular stripper 87 at its opposite end extending about the outer periphery of the upper die part 50 (FIG. 7) and serving to strip the formed article from said die part upon upward lifting movement thereof as the die is opened, to accommodate ready removal of the trimmed plate and the sheet from which it was formed as a unit. Cap screws 89 are slidably guided in the plate 51 in upwardly opening sockets 88 in the plate 51 and registering with the sockets 85. The lower end of each cap screw 89 is shouldered and threaded beneath the shouldered portion thereof into the annular stripper 87, to form guides for said stripper, and accommodate movement thereof to the position shown in FIG. 11, to effect the stripping of the die 50 from the formed plate 51, at the termination of the trimming operation of said plate. The stripper 87 is encircled by an annular pressure ring 90 made from a metal of high heat-conductivity and extending beneath the bottom surface of said stripper when the dies 50, 55 are in their closed position, to form the plate 51 and during trimming of the edge therof. The annular ring 90, besides forming a guide for the stripper, also serves to compress or pressurized the thermoplastic sheet 56 along the edge to be trimmed, to accommodate clean trimming of the edge of the sheet 56 by the thin edge 67 of the knife 61, and to hold the sheet so the heat ridge, heretofore present in trimming operations, has no place to form, as shown in FIG. 10, as the thin edge 67 of the knife 61 heated to a melting or vaporizing temperature is moved upwardly to effect a trimming operation.

In FIG. 11, the knife 61 is shown as retracted and the stripper 87 has stripped the die part 50 from the formed plate, with the plate trimmed from the foam sheet 56, except for the tabs 60.

In the formation of an article from a foam sheet 56, or the simultaneous formation of a series of articles from a single foam sheet, a series of dies similar to the dies 50 and 55 and knives 61 may be provided in aligned relation, either as part of a single apparatus or a series of forming apparatus. A thermoplastic sheet 56 may then be taken from its oven at a temperature between 250° F. and 350° F. depending upon the type of thermoplastic sheet used and the article to be formed. It may then be placed between the open dies 50 and 55 and the upper die parts 50 including the strippers 87 and outer annular rings 90 are brought downwardly into engagement with the sheet to form the sheet to the form of the surfaces 58 and 59 of the die parts, within the boundaries of the sheet. The sheet being formed and the article being pressurized about its periphery by the ring 90 and stripper 87 is now in position to be trimmed. The thin melting or vaporizing edges 67 of the annular knives 61 having slots 69 therein are then moved upwardly by the fluid pressure cylinder 75 and piston therein, and piston rod 77 extensible therefrom, to cleanly trim the edge of the articles from the sheet, except for the tabs 60,60, holding the articles to the sheet until the tabs 60,60 are broken. The upper dies 50 may then be raised while the stripper 87 comes into operation to strip the finished articles from the upper dies and accommodate removal of the finished articles and the sheet 56, and avoid the collection of scrap around the lower die and knife.

In this illustrative apparatus and method of carrying out the principles of my invention, the material is confined between two pieces of heat-conducting metal and pressurized along the perimeter to be trimmed, and the heat-conducting metal creates a definitive point at which melting or vaporization of the foam material by the melting or vaporizing edge 67 of the heated knife 61 stops. The dies pressurizing the foam material thus control the trim and permit the cutting action rather than the heat doing the cutting. The knife, however, is preferably heated to a temperature high enough to melt or vaporize the foam material and vaporize the material on the knife to avoid the leaving of residue on the knife and the necessity of cleaning the residue therefrom.

It should be understood that the flashpoint of foam is in the order of 926° F. and that the knife must be heated to a lower temperature which may be 800° F. or under, depending upon the type of material trimmed.

I claim as my invention:

1. An apparatus for heat-trimming thermoplastic foam materials by melting the portion of the thermoplastic foam to be trimmed comprising, two opposed non-heated, heat conducting metallic die parts made from a metal of high heat-conductivity and forming a trim guide for the foam material, and limiting the trimming action by absorbing the heat of melting of the foam material along the aligned edges of said die parts, as trimmed, and means carrying said absorbed heat away from said die parts, pressure means moving at least one die part relative to the other to open said die parts and receive the foam material to be trimmed therebetween, and operable to exert sufficient pressure on the foam material to compress the foam material along the edge to be trimmed, a source of heat at a temperature at least high enough to melt or vaporize at least a portion of the exposed foam material, and trim the exposed material along the die parts by melting at least a portion of the material up to the edges of the die parts, means applying the source of heat along the exposed edge of the foam material to melt or vaporize the edge of the foam material along the two die parts, said die parts having sufficient heat-conductivity to stop melting of the exposed material by absorbing the heat of melting of the foam material as pressurizing the foam material and provide a clean edge of the trimmed material without flash.

2. The apparatus of claim 1 in which the source of heat is a knive heated to the melting or vaporizing temperature of the foam material, and the die parts compressing the foam material are made from aluminum.

3. The apparatus of claim 2 in which coolant passageways are provided in the metallic die parts to accommodate the circulation of coolant therealong and retain the temperature of the die parts to a temperature sufficient to stop melting of the projecting edge of the foam material at the die parts, and to thereby create a region at which melting of the foam material by the source of heat stops.

4. The apparatus of claim 1 in which the opposed die parts of metal of high heat-conductivity include one recessed die part and another mating die part having a bottom surface conforming to and spaced from the recess of the recessed die part to accommodate the placing of a piece of foam material therebetween, wherein a stripper extends about the mating die part for stripping the trimmed and formed piece of foam material from the recessed die part, wherein the stripper has a heat-conducting pressure member extending thereabout and cooperating with the stripper and recessed die part, to compress the edge of the foam material to be trimmed, and wherein the source of heat is movable along the die parts to trim the foam material along the edge of the recessed die part by melting or vaporizing the foam material.

5. The apparatus of claim 4, in which the source of heat is a heated knife extending about one die part and moved toward and from said pressure member to effect trimming of the exposed edge of the piece of foam material by melting or vaporizing the exposed edge of the foam material to the outer surfaces of the die parts, which die parts stop melting of the foam material by the heat-conductivity thereof.

6. The apparatus of claim 5, in which the piece of foam material is placed between the die parts in a sheet-like form as it comes from the oven and is at oven temperature, and wherein the heated knife has spaced slots therein to leave tabs between the formed piece and sheet of foam material to adhere the formed piece to the sheet of foam material as removed from between the die parts.

7. The apparatus of claim 6, in which the die parts are made from aluminum and have passageways for liquid coolant therein, wherein coolant is circulated through the passageways and the stripper is spring-biased to strip the formed article from the one die part upon separation of said one die part from said other die part.

* * * * *